Jan. 23, 1945.   J. F. SULLIVAN ET AL   2,367,975
ELECTRICAL APPARATUS
Filed March 13, 1943
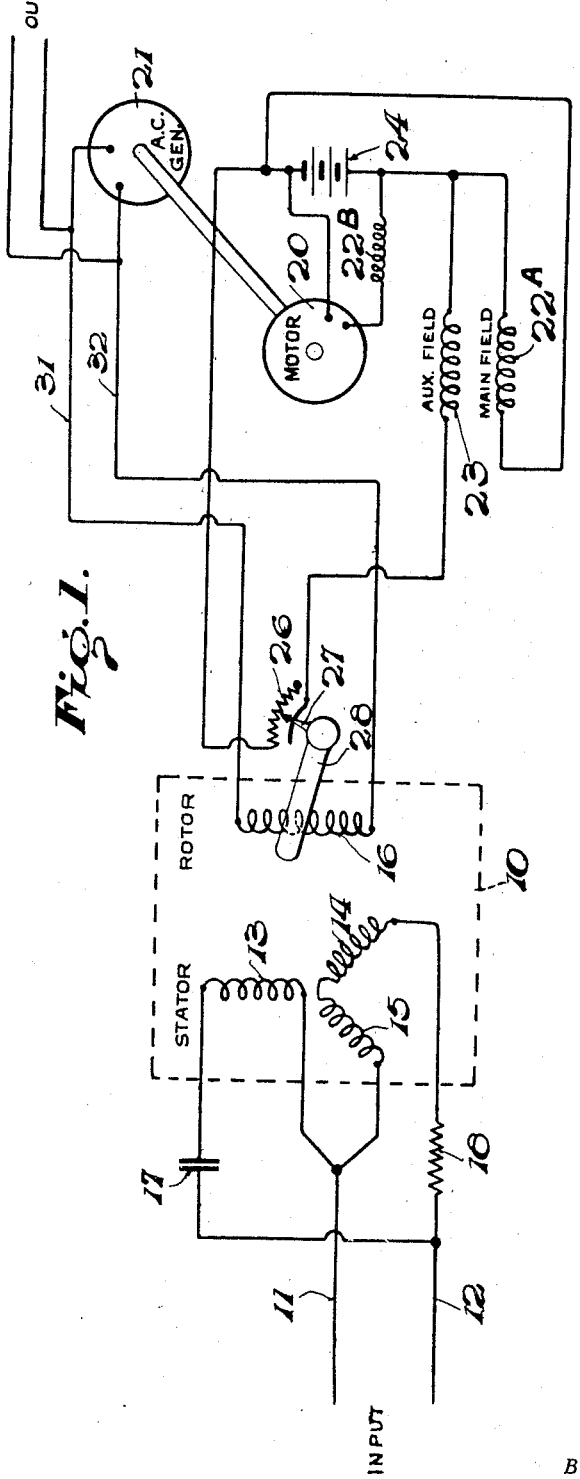
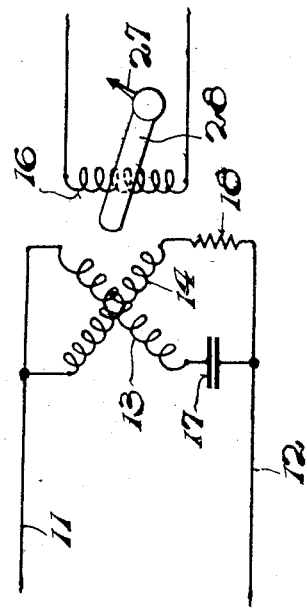
INVENTORS
James F. Sullivan
BY Raymond M. Berdett
Martin J. Finnegan ATTORNEY Patented Jan. 23, 1945

2,367,975

UNITED STATES PATENT OFFICE 2,367,975

ELECTRICAL APPARATUS

James F. Sullivan, Brooklyn, and Raymond M. Bendett, Jackson Heights, N. Y., assignors to Bendix Aviation Corporation, Bendix, N. J., a corporation of Delaware Application March 13, 1943, Serial No. 479,120

7 Claims. (Cl. 172—293)

This invention relates to electrical apparatus and methods, and particularly to the electrical synchronization of two electrical elements, as, for example, the two elements of a device capable of controlling the frequency of an alternating current circuit.

An object of the invention is to provide a novel synchronizing means and method involving the concept of maintaining a stable phase relationship between two electrical elements (such as the rotor and stator windings of an electric machine or instrument) together with the corollary concept of providing stability restoring means operative automatically to correct any occasional departure from phase stability, without manifesting any substantial tendency to oscillate or hunt.

Another object is to produce a correcting action, of the character indicated, in the form of a stability restoring means which is operative to transform an electrical change into physical motion, which physical motion is communicated to an electrical energy controlling device to cause the desired correcting action to occur.

In the herein described and illustrated embodiments of the invention the correcting action occurs as a result of the provision of capacity and resistance elements in such relationship to the stator windings of an electrical machine as to cause the rotor of said machine to move at a rate which is in direct proportion to the magnitude of the deviation in the constancy of the condition being governed. Specifically, where the condition being governed is the frequency of an alternating current circuit, the invention operates to produce a rotor movement of such a magnitude as to cause a precise and substantially immediate restoration of the desired frequency condition in said alternating current circuit, on each occasion when a deviation from said desired frequency has occurred.

In the accomplishment of this purpose it is proposed to employ—according to the herein illustrated embodiments of the invention—an electrical machine having a stator with two or more windings so connected that their fields are in time-quadrature relationship (magnetically) when both are energized by the current flowing in an alternating current "master" circuit of controlled frequency; the said relationship being obtained by use of a resistor and condenser properly proportioned to obtain such magnetic displacement of the fields of said stator windings as to produce a rotor movement of precisely the amount necessary to correct any deviation (of the circuit to be controlled) from the predetermined frequency.

Other objects and characteristics of the invention will become apparent from inspection of the following specification when read with reference to the accompanying drawing wherein are illustrated the preferred embodiments of the invention. It is to be expressly understood, however, that the drawing is for the purpose of illustration only, and is not designed as a definition of the limits of the invention, reference being had to the appended claims for this purpose.

In the drawing:

Fig. 1 shows schematically the application of the invention to the control of the frequency of an alternating current circuit; and Fig. 2 shows an alternate arrangement for the stator windings of the Fig. 1 circuit.

Reference characters 11 and 12 designate the leads of an A. C. "master" circuit whose frequency is controlled by any suitable means (not shown); 13, 14 and 15 are the windings of the stator of an electrical machine 10, which we may define as a "synchronizer"; 16 is the rotor winding of said machine; and 17 and 18 designate the condenser and resistor, respectively, inserted in different time-quadrature related branches of the stator circuit. A motor-generator set is shown at 20 and 21, with motor field windings 22 and 23 excited from a direct current source 24. A rheostat 26 includes a rotating contact 27 driven (through reduction gearing, not shown) from the shaft 28 carrying the rotor winding 16, and said rheostat is in series with the auxiliary field 23 of the motor 20. Leads 31 and 32 connect the rotor winding 16 with the output terminals of generator 21, whose frequency is to be controlled, as by causing it to synchronize with the frequency of the "master" circuit 11, 12.

With this arrangement it follows that angular displacement of the "synchronizer" rotor will occur only when, and so long as, there is a change in the normally prevailing electrical phase angle relationship between the two applied voltages of the stator and rotor. When such a change occurs—as, for example, upon a change in the speed of motor 20—the resulting rotation of shaft 28 will move the rheostat member 27, hence the strength of motor field 23 will vary, thus varying the speed of motor 20 and generator 21, and correspondingly varying the frequency of the current applied to rotor winding 16 by generator 21. In the disclosed apparatus, as now built, the gear reduction between 28 and 27 is such that approximately 20 revolutions of the shaft 28 are required to drive the rheostat member 27 between extremes of travel. Since frequency correction is always obtained within these extremes, the member 27 will cease movement before reaching the limit of travel, and will in the meantime have restored the desired frequency across the output terminals of the generator 21, by reason of the change in speed produced by the change in field current in auxiliary field 23 of motor 20.

In other words, as soon as the frequency of the output of generator 21 has been brought back to that of the "master" control circuit 11, 12, the desired stability of phase relationship between rotor and stator windings of unit 10 will have been restored, and movement of rheostat arm 27 will cease.

No further movement of rotor 16 will occur—unless and until there is some new departure of motor 20 from the constant frequency-maintaining speed; in which event the restoring action will be repeated.

The provision of a substantial speed reduction between the synchroniser motor 10 and rheostat control member 27, insures sufficiently slow changes of resistance in the auxiliary field circuit of motor 20 to compensate for the inherent lag of speed changes of the motor incident to increases or decreases in the auxiliary field strength, with the result that when the synchroniser motor is bringing the alternator into synchronism with the alternating current source 11—12, it will become inoperative substantially at the instant the desired frequency has been attained, and will not accelerate or decelerate the alternator beyond the synchronous speed. This precludes any substantial tendency for the system to oscillate or hunt under varying load conditions.

The modified construction of Fig. 2 differs from the one just described by employing an alternate form of stator circuit in the synchronizer motor. In this form of the invention a single field coil 14 replaces the two coils 14 and 15 of Fig. 1, coil 14 of Fig. 2 being disposed in time-quadrature relationship to coil 13. This device functions in the same manner as the one of Fig. 1 to maintain the frequency of the alternator output in synchronism with the alternating current source 11—12.

What is claimed is:

1. In a synchronous system, a source of alternating current of predetermined frequency; an alternator whose output frequency is to be synchronized with said predetermined frequency; an electric driving motor coupled to said alternator and having a speed control circuit; a control mechanism connected to said alternator and to said source of alternating current and coacting with said motor to automatically vary its speed and synchronize the frequency of said alternator with said predetermined frequency, said mechanism comprising a self-synchronous differential motor having stator and rotor windings, one of said windings being energized by said alternator and the other winding being energized by said source of alternating current, whereby said rotor will rotate at a speed and in a direction determined by the difference in frequencies of alternator output and said source of alternating current, and will cease rotating when said frequencies are in synchronism; and means, controlled in accordance with rotation of said rotor, and connected to the speed control circuit of said driving motor, for increasing or decreasing the speed of said motor, for bringing said alternator into synchronism with said source of alternating current.

2. The synchronous system defined in claim 1, wherein said source of alternating current provides single phase current and the stator winding of said differential motor comprises a two-phase winding connected to said single phase source by means placing said windings in time-quadrature relationship.

3. In a synchronous system, a motor-generator assembly comprising a motor having a main field and a control circuit whose resistance is operable to determine the speed of said motor; and an alternator providing alternating current whose frequency varies in accordance with variations in the speed of said motor, a source of alternating current of predetermined frequency; and control means, automatically operable in response to differences in the frequencies of said source of alternating current and the output of said alternator, for increasing or decreasing the resistance of said motor control circuit and thereby varying the speed of said motor to bring said alternator into synchronism with said predetermined frequency.

4. The electrical system defined in claim 3, wherein said control circuit comprises an auxiliary field and a rheostat having a rotatable control element, and said control means comprises a device for rotating said control element in a direction to increase the resistance when said alternator exceeds synchronous speed and to decrease the resistance when said alternator drops below synchronous speed.

5. The electrical system defined in claim 3, wherein said control means comprises a self-synchronous motor having a rotor winding and a stator winding, and one of said windings is energized by said alternator and the other is energized by said source of alternating current, whereby said rotor will rotate at a speed, and in a direction determined by the difference in frequencies of said alternator and alternating current outputs.

6. In an electrical apparatus, a driving motor having a speed control circuit embodying a variable field resistance, said motor being so constructed that changes of speed in response to variations in its field resistance will lag such variations by a predetermined degree in point of time; an alternator driven by said motor; a source of alternating current of predetermined frequency; a control device coacting with said motor and alternator and automatically operable to vary the resistance of said variable field resistance in accordance with the difference in frequencies of said alternating current source and the output of said alternator, for bringing the latter into synchronism with said predetermined frequency, said control device embodying means for preventing said variable resistance from being varied at a rate greater than the predetermined degree of lag of speed of said motor in response to changes in resistance, whereby said alternator will be accelerated or decelerated to, and not beyond the synchronous speed.

7. The electrical apparatus defined in claim 6, wherein said variable field resistance comprises a rheostat having a rotatable control element, and said control device comprises a self-synchronous motor having rotor and stator windings energized by said alternator and said source of alternating current, whereby said rotor rotates at a speed proportional to the difference in frequencies of said source of alternating current and said alternator; and a speed reducing device drivingly inter-connecting said rotor and said rheostat, for causing said control element to rotate at a substantially lower speed than said rotor.

JAMES F. SULLIVAN.
RAYMOND M. BENDETT.